United States Patent [19]

Nelson Holland et al.

[11] 4,414,918
[45] Nov. 15, 1983

[54] DISTRIBUTOR HEAD FOR A PIPE LINING MACHINE

[75] Inventors: Henry A. Nelson Holland; James Bandura, both of Houston, Tex.

[73] Assignee: Raymond International Builders, Inc., Houston, Tex.

[21] Appl. No.: 347,934

[22] Filed: Feb. 11, 1982

[51] Int. Cl.³ .............................................. B05C 7/02
[52] U.S. Cl. .................................. 118/306; 118/317; 239/222
[58] Field of Search ................. 118/306, 317; 239/222

[56] References Cited

U.S. PATENT DOCUMENTS

| | | | |
|---|---|---|---|
| 1,971,535 | 8/1934 | Perkins | 91/44 |
| 2,102,738 | 12/1937 | Perkins | 91/44 |
| 2,168,917 | 8/1939 | Perkins | 25/38 |
| 2,262,647 | 11/1941 | Perkins | 91/44 |
| 2,303,088 | 11/1942 | Perkins | 91/44 |
| 2,670,991 | 3/1954 | Perkins | 299/63 |
| 2,865,322 | 12/1958 | Perkins | 118/306 |
| 2,892,444 | 6/1959 | Perkins | 118/306 |
| 2,922,583 | 1/1960 | Perkins | 239/215 |
| 3,108,348 | 10/1963 | Schultz | 118/306 |
| 3,159,895 | 12/1964 | Perovich | 118/306 |
| 3,233,580 | 2/1966 | Levake | 239/223 |
| 4,233,932 | 11/1980 | Blakeslee | 118/306 |

FOREIGN PATENT DOCUMENTS 852474 10/1960 United Kingdom .

OTHER PUBLICATIONS

Raymond International Inc. Drawing No. CL-3399-D, CL-3400-B 6/19/73.

Primary Examiner—James R. Hoffman
Attorney, Agent, or Firm—Fitzpatrick, Cella, Harper & Scinto

[57] ABSTRACT

A distributor head for throwing mortar onto the wall of a pipe (12) being lined. A set of inner rotating vanes (56) throw the mortar onto an outwardly flared conical surface (40) and the mortar travels along the surface (40) to the outer vanes (48) on its outer edge from which the mortar is thrown in a high velocity, dense stream against the pipe wall. The inner vanes are individually and releasably fitted into a collar (60) at the inner edge of the flared conical surface.

13 Claims, 31 Drawing Figures

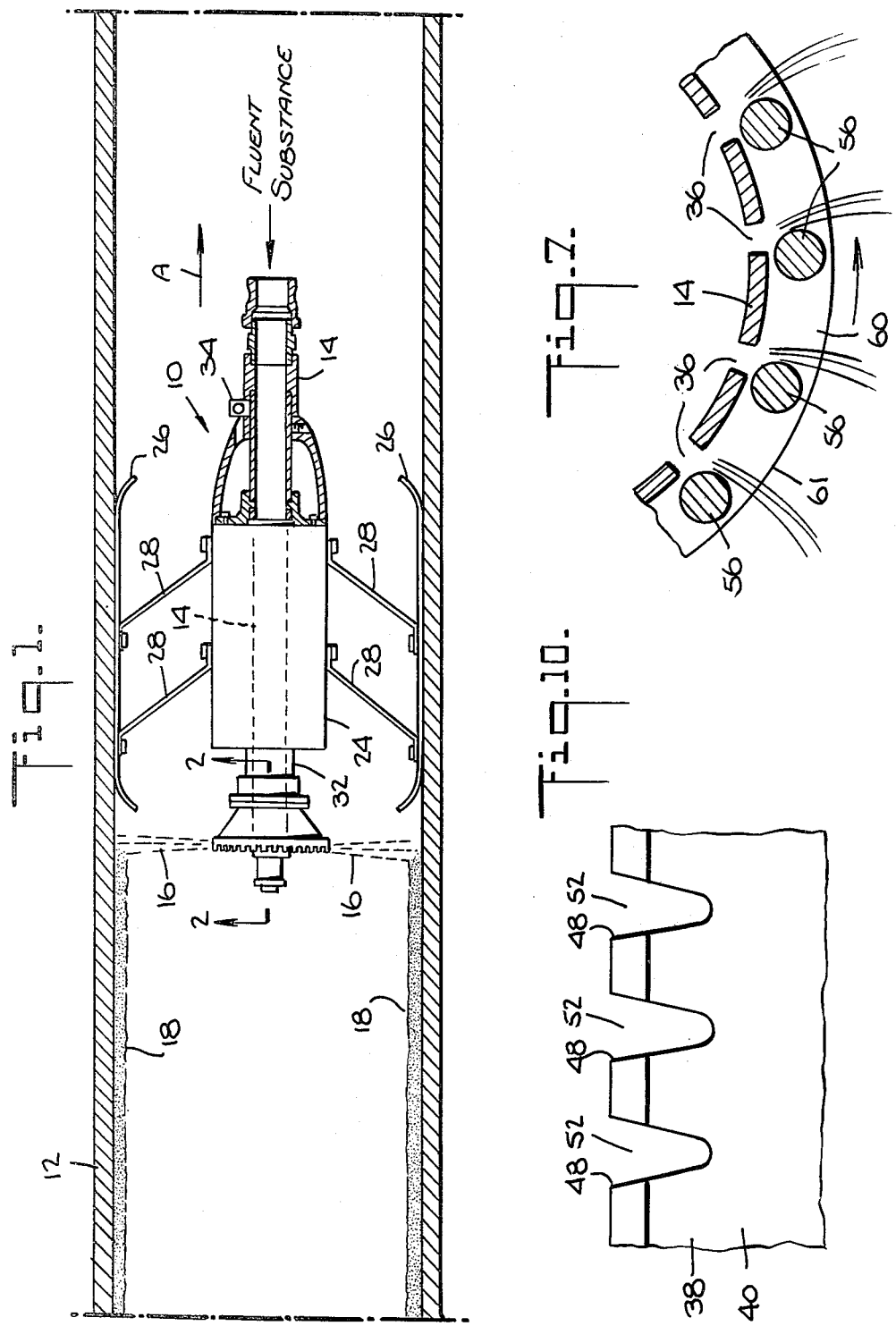

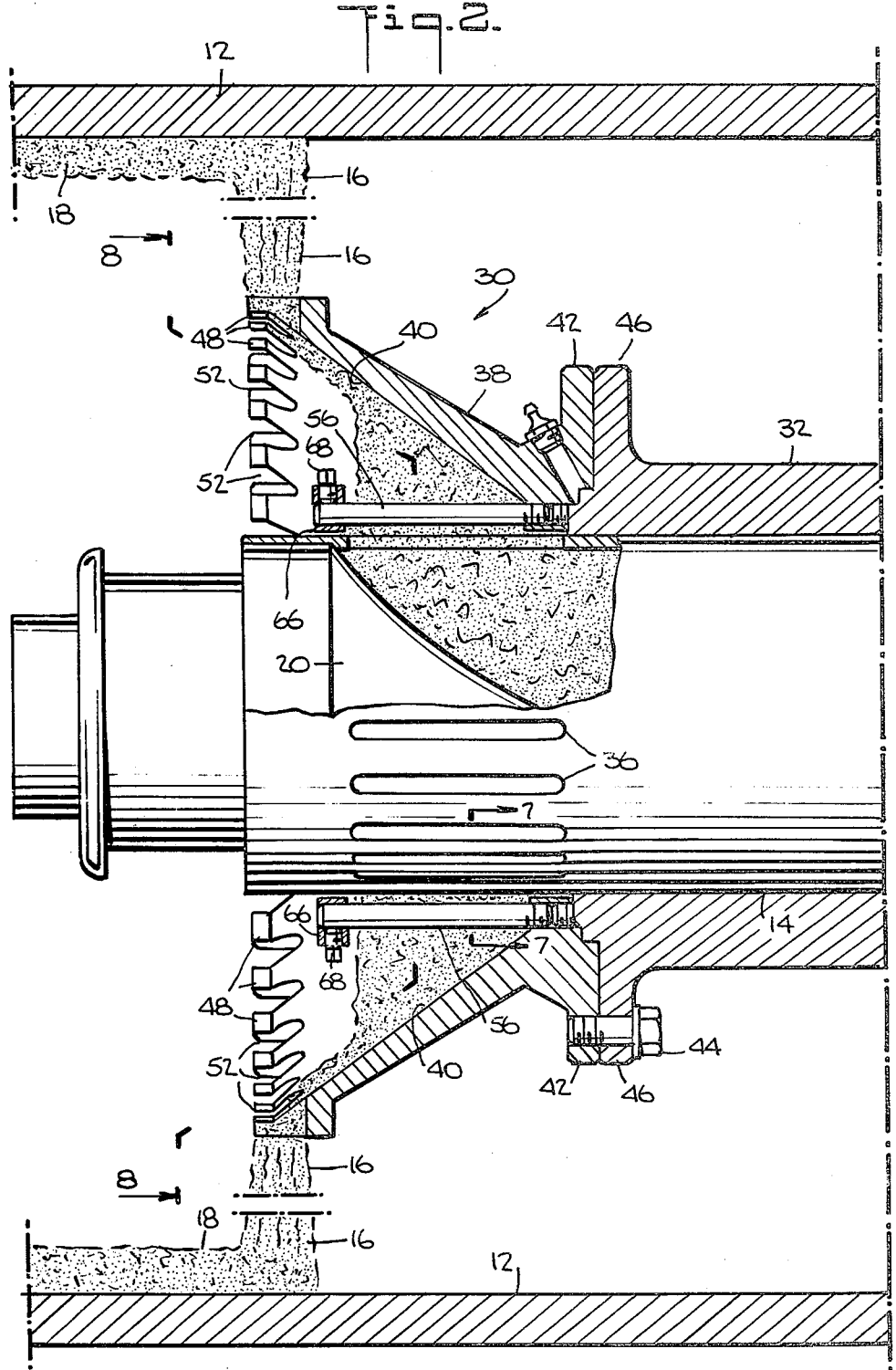

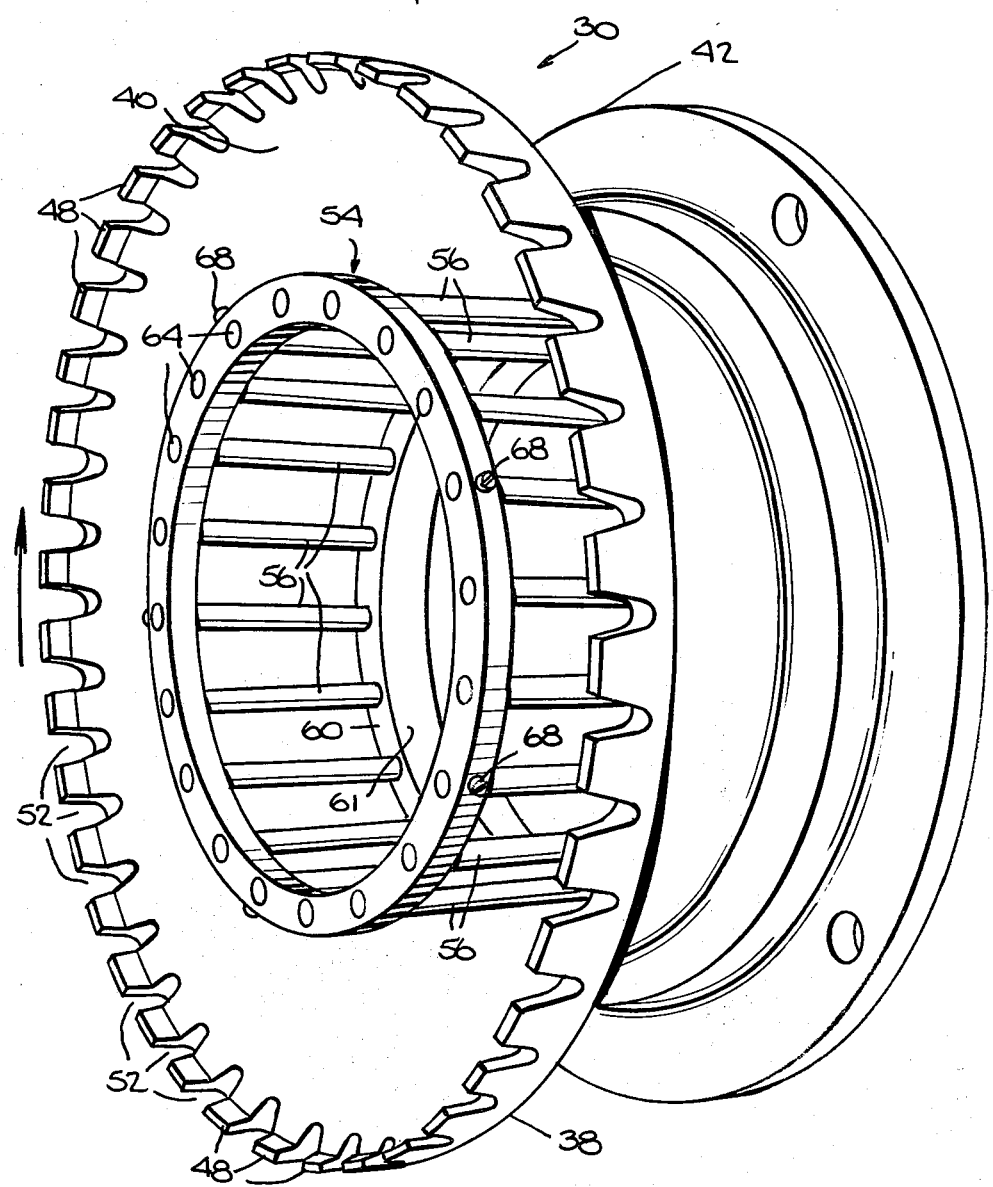

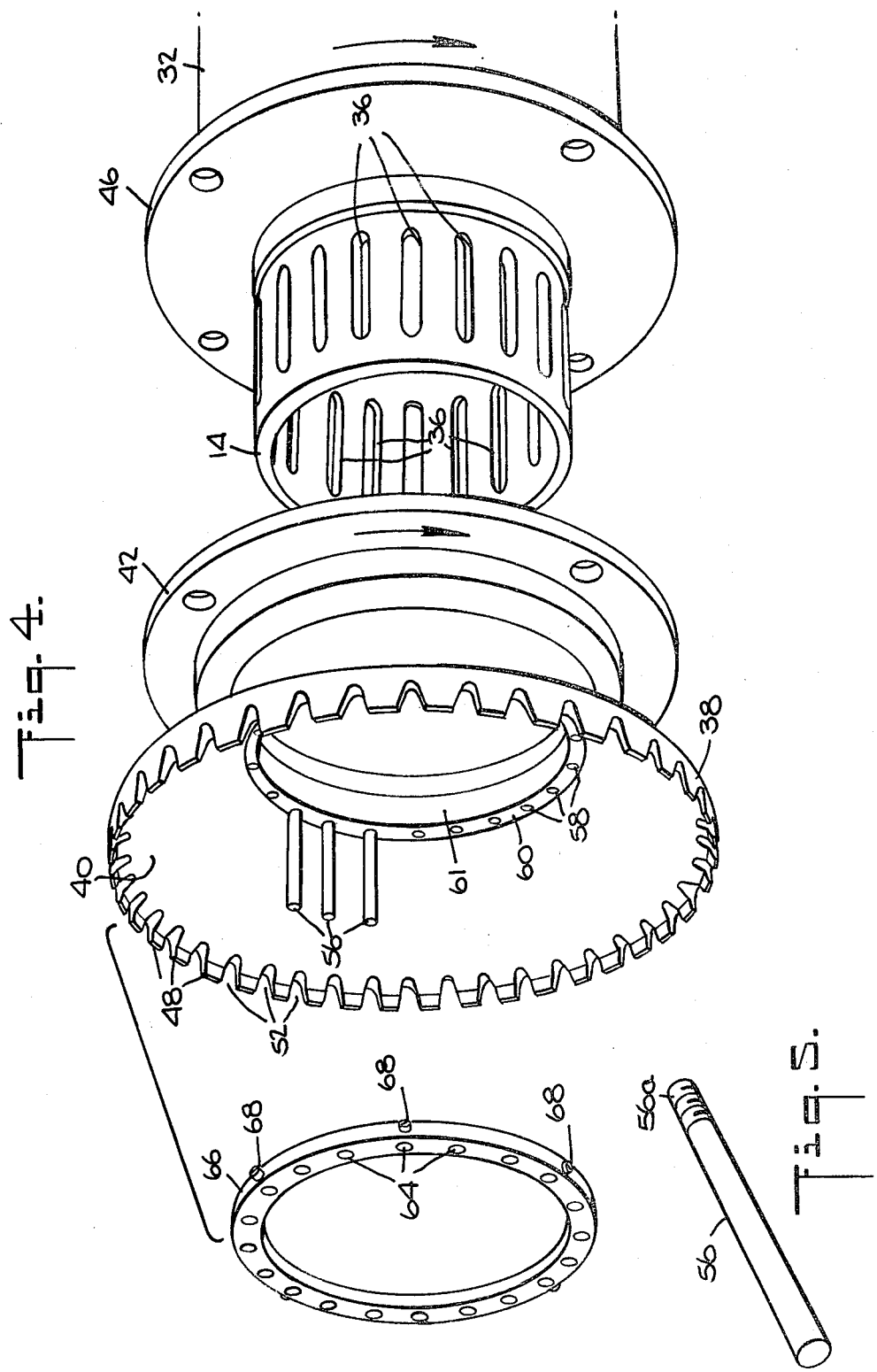

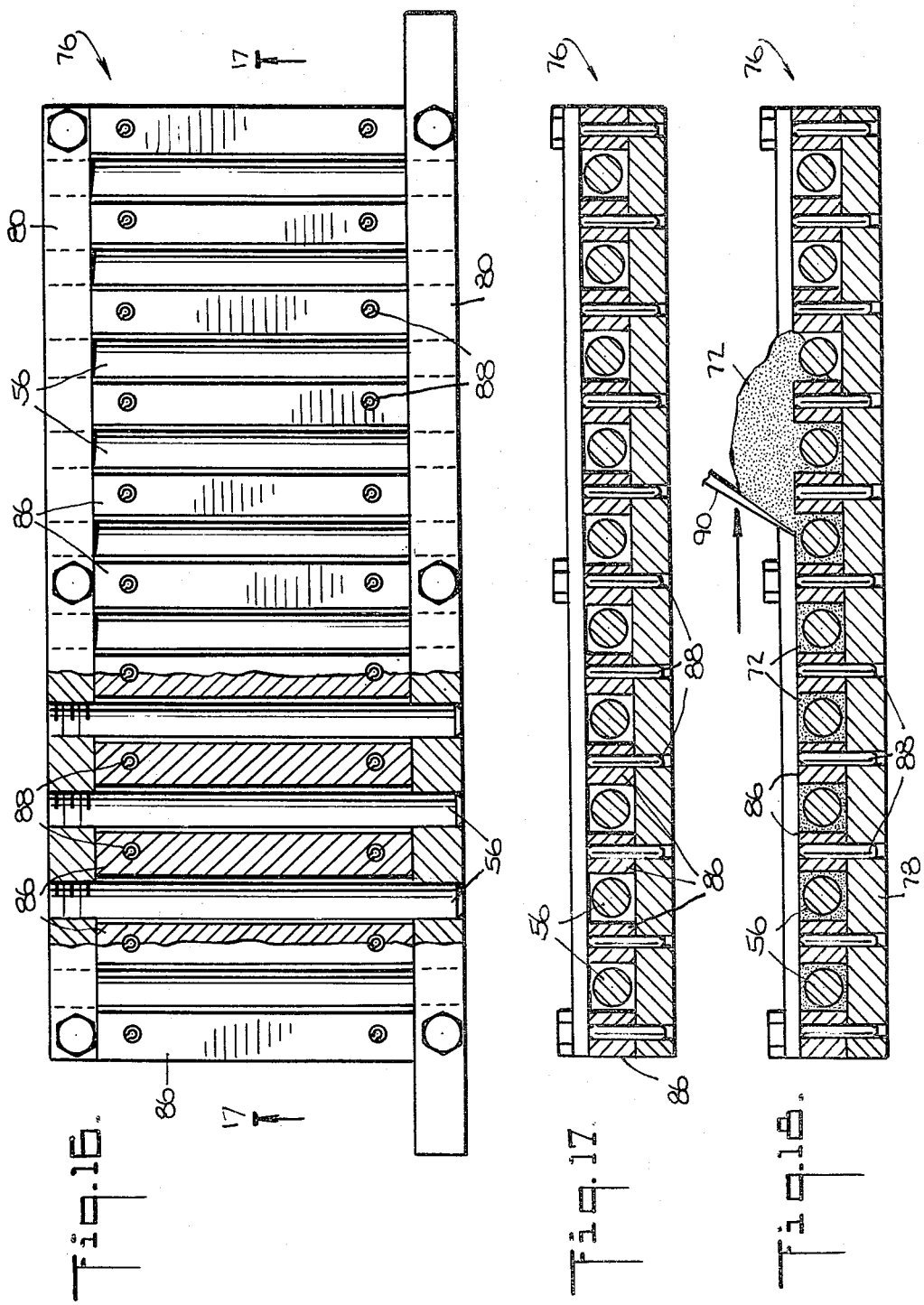

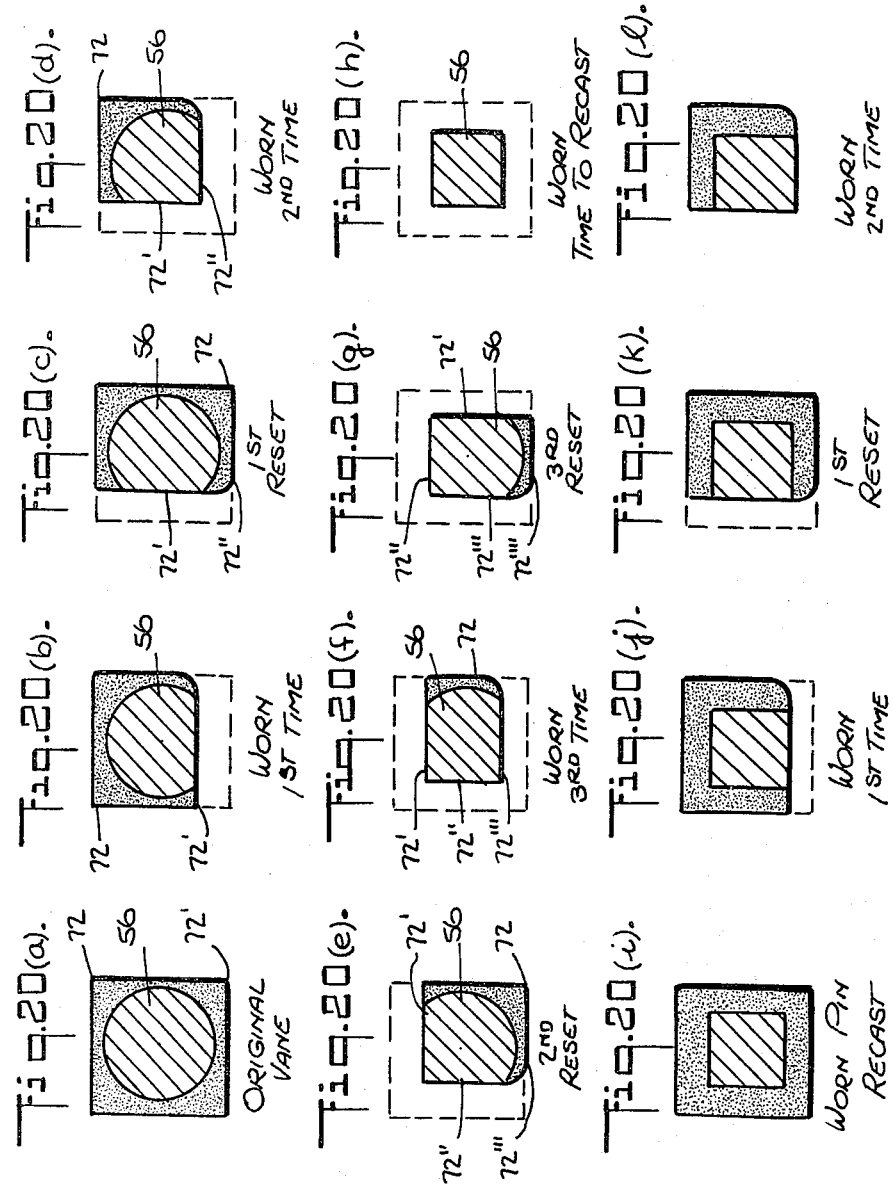

DISTRIBUTOR HEAD FOR A PIPE LINING MACHINE

BACKGROUND OF THE INVENTION

1. Field of the Invention

This invention relates to the lining of pipes and in particular it concerns a novel distributor head for applying a hardenable fluent material, such as concrete or mortar, to the inner surface of pipes by throwing the material outward against the inner pipe surface.

2. Description of the Prior Art

The use of devices for throwing a fluent lining material against the inner wall of a pipe is well known. U.S. Pat. No. 2,168,917 to Perkins and United Kingdom Pat. No. 852,474 to Schultz describe such devices.

The Perkins patent shows a central feed conduit through which mortar is fed to a distributing head. The distributing head is in the form of a dished plate whose concave side faces and is positioned adjacent the open end of the feed conduit to receive the mortar. Applied to the concave side of the distributing plate are material-intercepting blades which are disposed substantially tangentially to the hub of the plate. The outer edges of these blades terminate short of the peripheral edge of the plate while their inner portions are provided with notches into which the discharge end of the conduit extends, whereby the inner positions of the blades are disposed in the path of the material exiting from the end of the conduit to intercept it and direct it outwardly over the plate, as the plate and blades rotate. According to the Perkins patent, the material is held to the distributing plate a sufficient time to thin and smooth out before it is discharged from the periphery of the plate onto the wall of the pipe being lined.

The Schultz patent shows a distributor head which receives cement-mortar from a supply pipe, the rear end of which is formed with a series of slots providing openings to the distributor head. The distributor head itself comprises a series of radial plates slotted at their outer edges and clamped between front and rear plates. The front plate extends forwardly as a socket in which a drive shaft is fixed. The rear plate extends over the end of the supply pipe. When the fluent cement-mortar reaches the end of the supply pipe it is forced through the slots. The drive shaft turns the front and rear plates and the radial plates over the slots 26 to intercept the cement mortar and throw it outwardly against the walls of the pipe being lined.

Both Perkins and Schultz show the spraying of a fluid coating over the applied lining. In Perkins the fluid coating is sprayed from a feed pipe onto an outwardingly flared annular wall of a cup shaped member. The cup shaped member has an inwardly turned flange around its outer edge and ports or orifices are provided in the flange for the discharge of the fluid material in this streams onto the pipe wall. In Schultz a second lining material is fed under pressure through a second supply pipe and this material is forced through slots in the pipe and is thrown outwardly and rearwardly by radial blades which revolve about the slots.

A further prior art distributor head has a rotating member having an outwardly flared inner surface and means for depositing the fluent substance onto the inner surface of the rotating member so that, as the member rotates, the fluent substance is caused, by centrifugal action, to flow along its inner surface toward its outer edge. A plurality of vanes are distributed about and mounted on the rotating member to extend axially and radially outward from its said outer edge to receive the fluent substance which flows along the inner surface of the rotating member and throw the substance outwardly against the pipe wall. Also, the inner surface of the rotating member is formed, at its outer edge, with slots leading to the spaces between the vanes and these slots are tapered with their narrower ends closest to the inner surface of the rotating member so that the fluent substance will be distributed evenly over the surfaces of the outer vanes. The depositing means which deposits the fluent substance onto the inner surface of the rotating member is formed by a supply conduit having elongated slots distributed thereabout which extend axially of the conduit and through which the fluent substance passes and a plurality of vanes which revolve about the conduit to engage the fluent substance and throw it outwardly onto the inner surface of the rotating member. The slots and vanes of this prior art device extend over substantially the same axial region as the flared inner surface of the rotating member.

The prior art device described above improves over the devices of the Schultz and Perkins patents in that it is capable of throwing lining material in a narrower and more dense stream than was possible with the earlier devices.

SUMMARY OF THE INVENTION

The present invention provides an improvement over the above described prior art devices in that it provides a more wear resistant, longer lasting and more economical distributor head.

According to the invention there is provided a novel distributor head for lining pipe which comprises an outer rotating member having an outwardly flared inner surface onto which a fluent substance is deposited by a depositing means. The depositing means comprises an inner conduit having axially elongated slots distributed thereabout and a plurality of inner vanes mounted to revolve about the inner conduit over the slots to engage the fluent substance and throw it outwardly against the flared inner surface of the rotating member. The inner vanes may be of simple rod like construction and may be put into assembly and replaced with a minimum of difficulty. Specifically the vanes are individually and releasably fitted into a collar at the inner edge of the outer rotating member. The vanes may be individually coated with a wear resistant substance and they can be turned in place, as they wear, so that an unworn portion of their surface will be brought into facing relationship to the conduit slots.

BRIEF DESCRIPTION OF THE DRAWINGS

Preferred embodiments of the invention have been chosen for purposes of illustration and description; and are shown in the accompanying drawings, forming a part of the specification, wherein:

FIG. 1 is a side elevation view of a pipe lining machine in a pipe and incorporating a novel distributor head according to the present invention;

FIG. 2 is an enlarged section view, partially broken away, taken along line 2—2 of FIG. 1;

FIG. 3 is a perspective view of the rotating portion of the distributor head of FIG. 1;

FIG. 4 is an exploded perspective view illustrating the assembly of the distributor head of FIG. 1;

FIG. 5 is a perspective view showing a removeable inner vane used in the distributor head of FIG. 1;

FIG. 7 is a fragmentary section view taken along line 7—7 of FIG. 2;

FIG. 10 is a fragmentary view taken along line 10—10 of FIG. 9;

FIG. 15 is a fragmentary perspective view of a portion of a fixture used in manufacturing the inner vanes shown in FIG. 14;

FIG. 16 is a plan view of the fixture of FIG. 15;

FIG. 17 is a section view taken along line 17—17 of FIG. 16;

FIG. 20 is a series of cross section views of the inner vane of FIG. 14 showing its change in configuration and orientation during use.

DETAILED DESCRIPTION OF THE PREFERRED EMBODIMENTS

Figure 6:
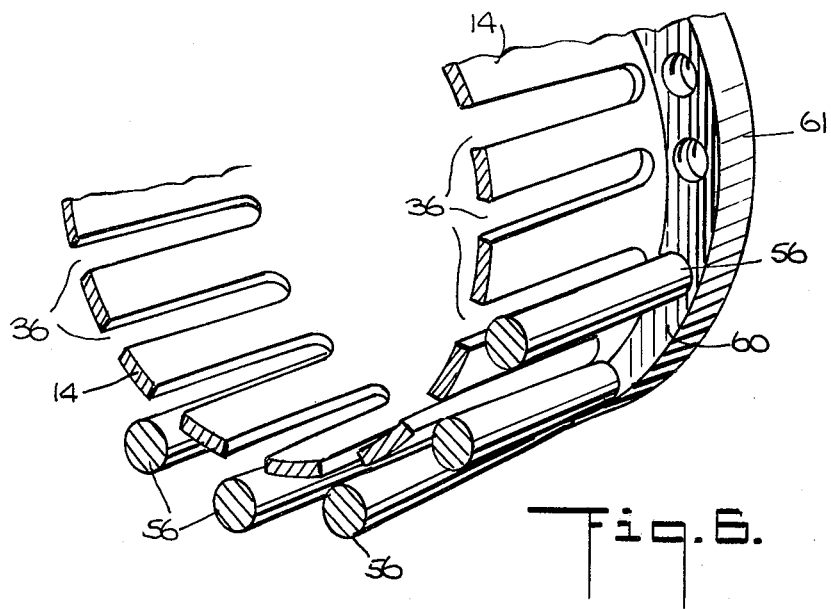
FIG. 6 is an enlarged fragmentary perspective view showing the positional relationship of supply slots and inner vanes in the distributor head of FIG. 1.

Referring first to FIG. 1, there is shown a pipe lining machine 10 which is pulled, by suitable means (not shown), in the direction of an arrow A through the interior of a pipe 12, being lined. As the machine 10 is pulled through the pipe 12 a fluent lining substance is supplied to one end of the machine via a supply conduit 14 from an external source (not shown) and is emitted from the other end of the machine in the form of a radial spray 16 which deposits itself about the interior of the pipe 12 to form a lining 18.

The machine 10 comprises a main body 24 which is supported centrally inside the pipe 12 by means of shoes 26. The shoes 26 slide along the inside of the unlined portion of the pipe 12 and they are connected via leaf springs 28 to the body portion 10. As can be seen in FIG. 1, the supply conduit 14 extends axially through the body 10 and into a distributor head 30. The distributor head 30 is supported axially inside the pipe 12 by means of a rotating sleeve 32 which extends from the end of the body 24. The sleeve 32 is actually part of the armature of an electric motor (not shown) formed inside the body 24. The stator portion of the motor is secured to the inside of the body. Electrical power for the motor is supplied by leads (not shown) which extend through the pipe 10 along the supply conduit 14.

In operation, the pipe lining machine 10 is pulled through the pipe 12 by means of a suitable cable or rope (not shown) attached to an eye 34 at the end of the machine opposite the distributor head 30. At the same time the fluent lining substance is supplied from sources external to the pipe along the supply conduit 14. Also, the distributor head 30 is rotated by the sleeve 32 at high velocity to spray the fluent lining substance onto the inner surface of the pipe to form the lining 18. The lining substance may be pumped through the conduit 14 or it may be impelled by a screw conveyor (not shown) which extends through the conduit.

The construction of the distributor head 30 is best seen in FIGS. 2-5. As can be seen in FIGS. 2 and 4, the first supply conduit 14 extends through the sleeve 32 and into the distributor head 30; and it is closed at its end by a concave conical or trumpet shaped end piece 20. The supply conduit 14 is formed, just before its closed end, with a plurality of axially elongated slots 36 distributed about its circumference and communicating between the inerior of the conduit to the outside thereof. The supply conduit 14 does not rotate but the sleeve 32 rotates about it.

As can be seen in FIGS. 2 and 3, the distributor head 30 comprises a rotating body 38 having an outwardly flared, conical inner surface 40. The inner or smaller diameter end of the body 38 is formed with a radial flange 42 which is attached by means of bolts 44 to a corresponding flange 46 on the rotating sleeve 32. The outer or larger diameter end of the body 38 is provided with outer vanes 48 having surfaces 50 which extend rearwardly and radially outwardly from the flared inner surface 40. The flared inner surface 40 communicates with the vanes 48 via tapered slots 52 between the vanes.

The distributor head 30 also comprises a sleeve 54 which extends around the slotted portion of the supply conduit 14. The sleeve 54, as can be seen in FIG. 2 extends axially inside the flared inner surface 40 of the rotating body 38. As shown in FIGS. 2-4, the sleeve 54 comprises a plurality of spaced apart inner vanes 56 distributed about the slots 36 of the first supply conduit 14.

As shown in FIG. 5, each vane 56 is in the form of a cylindrical rod formed with a thread 56a on one end. The rods forming the vanes 56 are threaded into tapped holes 58 (FIG. 4) on a shoulder 60 which extends radially inwardly of the inner or smaller diameter end of the body 38. The shoulder 60 is part of a collar 61 which is formed integrally with the rotating body 38. As can be seen the rod like vanes 56 extend parallel to the supply conduit 14 just over the slots 36 within the region of the flared inner surface 40 of the rotating body 38. it will also be appreciated that the vanes 56 revolve about the outer surface of the supply conduit 14 when the body 38 is rotated by the sleeve 32. In order to lock the vanes in position in the tapped holes 58, setscrews 62 (FIG. 2) extend into the other ends of the tapped holes 58 and are tightened against the ends of the rod-like vanes 56.

The outer ends of the rod like vanes 56 are not threaded. These outer ends extend into openings 64 in an outer ring 66. In order to hold the ring 66 to the vanes, locking screws 68 are threaded into the ring 66 at various ones of the openings 64 and are tightened against the vanes 56 where they extend into the openings. It is not necessary to have a locking screw at every vane. In the embodiment described herein there are twenty vanes; and a locking screw is provided for each fifth vane.

While the invention is not limited to specific dimensions, the basic dimensions of the embodiment of FIGS.

1–5, which was actually built for lining a forty eight inch (122 cm) diameter pipe, are as follows: The rotating body 38 flares outwardly, at a 72° included angle, from a smaller end diameter of six and one quarter inches (15.9 cm) to an outer end diameter of eleven and five eights inch (29.53 cm) diameter. The shoulder 60 extends radially inward from the small diameter end to a diameter between 5.310 and 5.315 inches (13.487 and 13.500 cm.). The inner vanes 56 are made of three eights inch diameter (0.952 cm) round stock; and they extend about three inches (7.62 cm) out from the shoulder 60. The vanes 56 are centered on the circumference of a five and three quarter inch (1.905 cm) diameter circle. There are twenty inner vanes 56 equally spaced about such circle.

The outer vanes 48 are formed integrally with the rotating body 38 to extend outwardly from its outer end. The outer vanes each extend about three quarters of an inch (1.905 cm) in the axial direction. The inner edges of the outer vanes are formed as continuations of the flared inner surface 40 of the rotating body 38 up to a location about five sixteenths of an inch (7.94 mm) from the outer edge of the body 38; and from there on, the inner edges of the outer vanes extend in an axial direction. The tapered slots 52 between the outer vanes 48 expand at an included angle of about 20° in an axial direction toward the outer edge of the vanes. The outer vanes have a radial extent of about three sixteenths of an inch (4.76 mm) at their outer edges and about nine sixteenths of an inch (14.29 mm) at their inner edges. There are forty of the outer vanes 48 spaced equally from each other about the rotating body 38.

In operation of the distributor head 30 the body 38 is driven via the sleeve 32 to rotate at a speed of about twelve hundred revolutions per minute over the stationary supply conduit 14. A fluent lining substance, such as mortar is fed through the conduit 14; and this substance passes out through the axially elongated slots 36 into the path of the rotating rod-like inner vanes 56.

Figure 8:
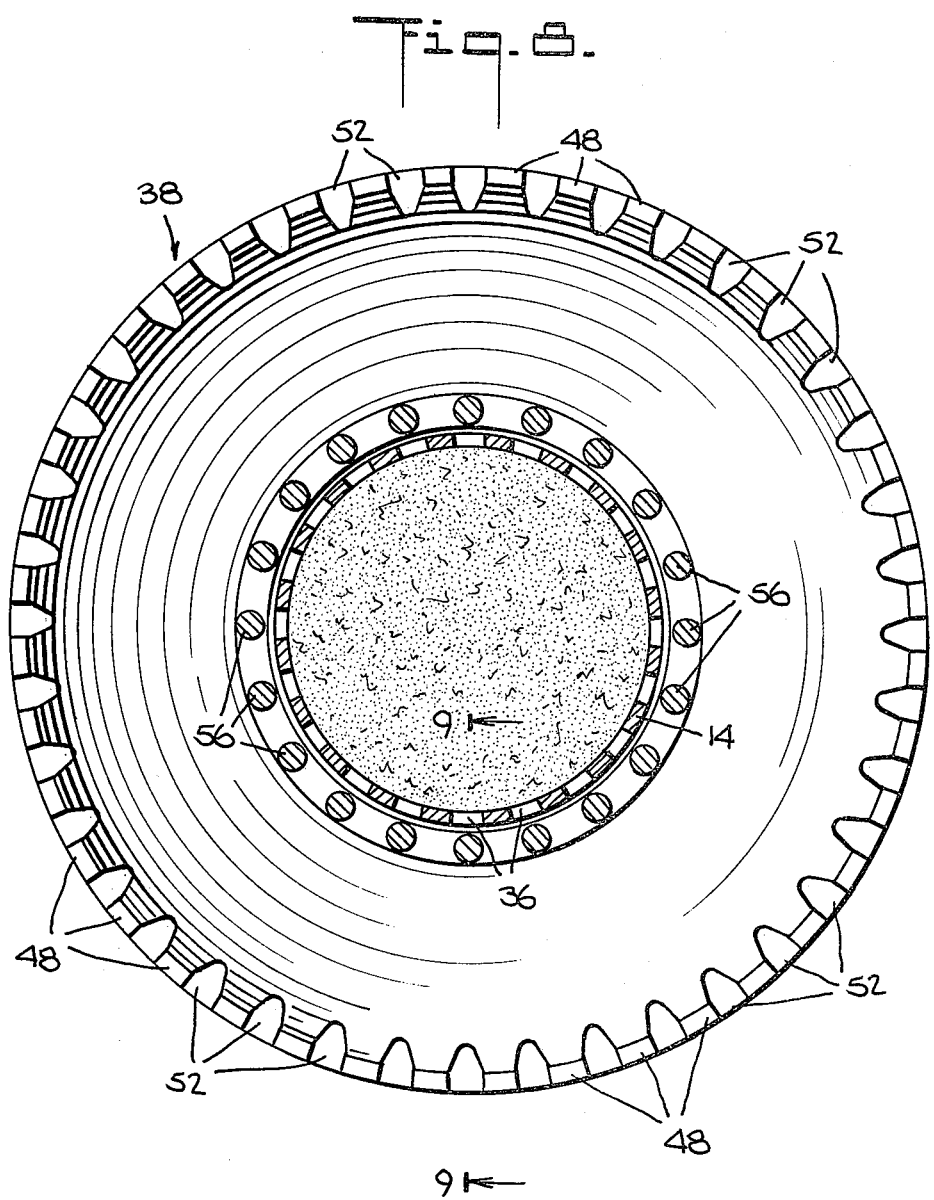
FIG. 8 is a rear view, partially in section, taken along line 8—8 of FIG. 2.

As can be seen in FIGS. 6, 7 and 8 the inner vanes 56 pass closely over the axially elongated slots 36 and intercept the fluent substance exiting from the slots. The vanes separate the fluent substance into discrete portions and then they throw each portion outwardly against the flared inner surface 40. When the fluent substance reaches the rotating surface 40 it becomes subjected to centrifugal action; and, because of the flared configuration of the surface 40, the fluent substance is impelled out toward the outer vanes 48. Because the flared surface 40 increases in diameter toward its outer edge, the fluent substance spreads out and becomes thinner as it moves toward the outer vanes 48. Since the inner vanes 56 extend axially over a considerable portion of the axial length of the flared inner surface 40 additional amounts of the substance thrown onto the outer portions of the surface from the vanes.

Because of the outward conical shape of the surface 40, and the centrifugal action it imparts to the fluent substance, it flows along the surface in a spiral path. As a result, when the fluent substance reaches the tapered slots 52 between the outer vanes 48 it encounters the vanes at an angle while it flows into the spaces between the vanes. As a result the fluent substance is fully engaged by the vane surfaces 50 and is evenly distributed over the vane surfaces. When the fluent substance reaches the surfaces 50 of the outer vanes 48 it is no longer subject to any movement in the axial direction; and the outer vanes impart a large force to the fluent substance to impell it at high velocity outwardly against the wall of the pipe 12 being lined.

Figure 9:
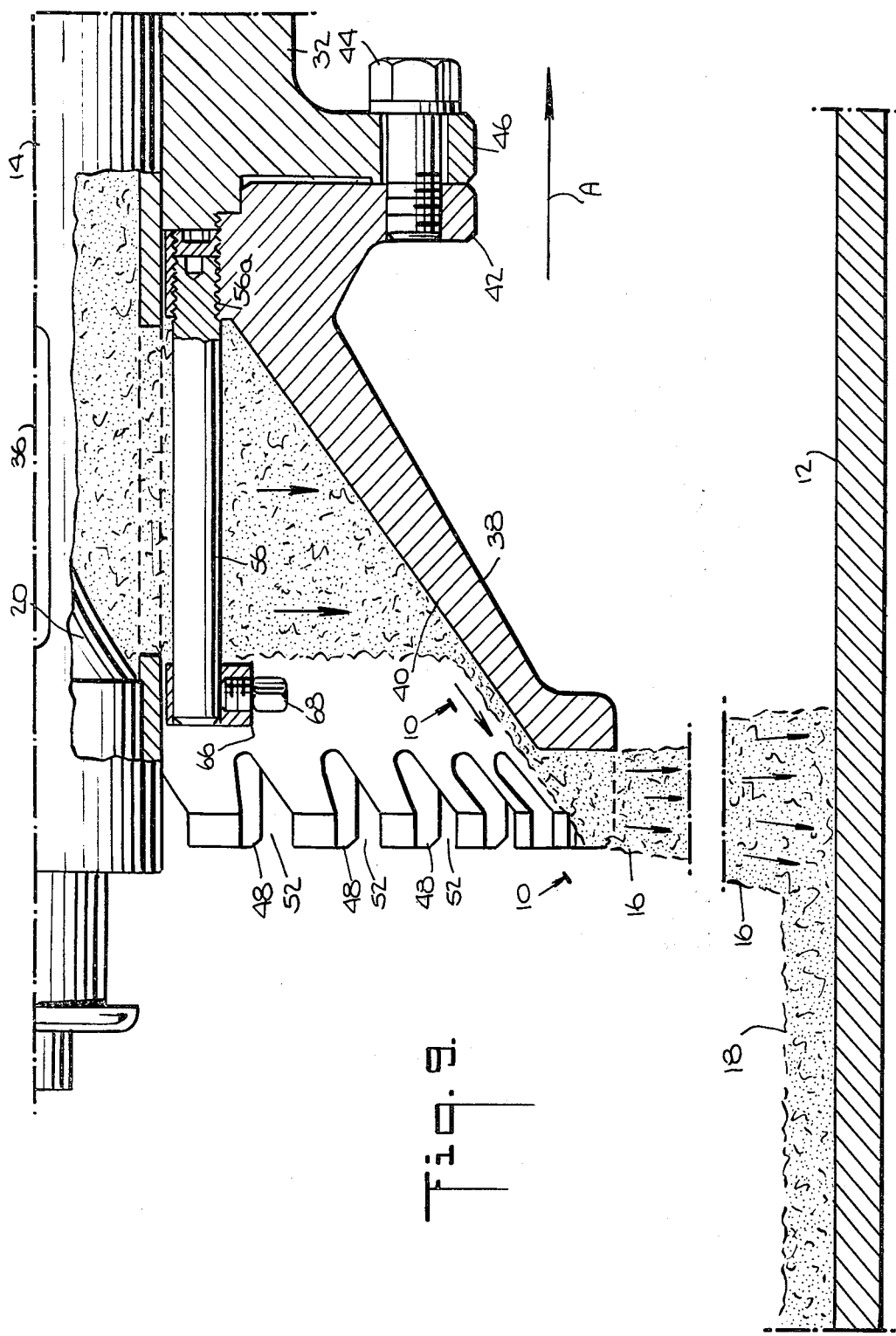
FIG. 9 is a fragmentary section view showing an enlargement of a portion of FIG. 2.

As can be seen in FIG. 9 the outer vanes 48 cause the fluent substance to be thrown as a narrow, dense stream. As a result when the fluent substance is wet mortar, this narrow dense stream will result in the solid particles having less tendency to dry out in flight than in the case where a more dispersed stream is produced. As a result the adhesion of the particles to the pipe is enhanced. Additionally, the narrow spray pattern serves to concentrate particle impact energy over a small surface area of the pipe being lined; and this in turn produces a high unit pressure on the lining so that any entrapped air bubbles are squeezed out. It has also been found that the fluent substance distributes itself as it flows toward the outer vanes so that a very even spray pattern is produced. Further, in the described embodiment the centrifugal force produced by flared rotating body 38 increases from seventy times the force of gravity, at the small diameter end of the body, to one hundred thirty times the force of gravity at the outer vanes. Because of this, the lining operation is nearly completedly isolated from the effects of the earth's gravity.

Figure 11:
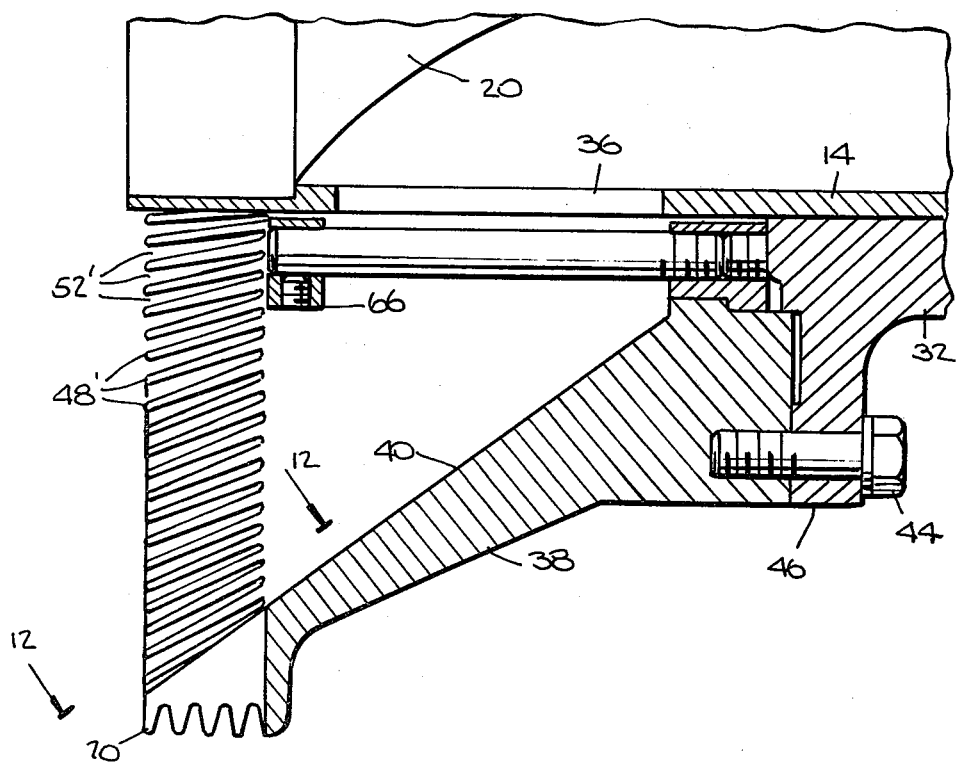
FIG. 11 is a view similar to FIG. 9 but showing a modification of the distributor head of FIG. 1.
Figure 12:
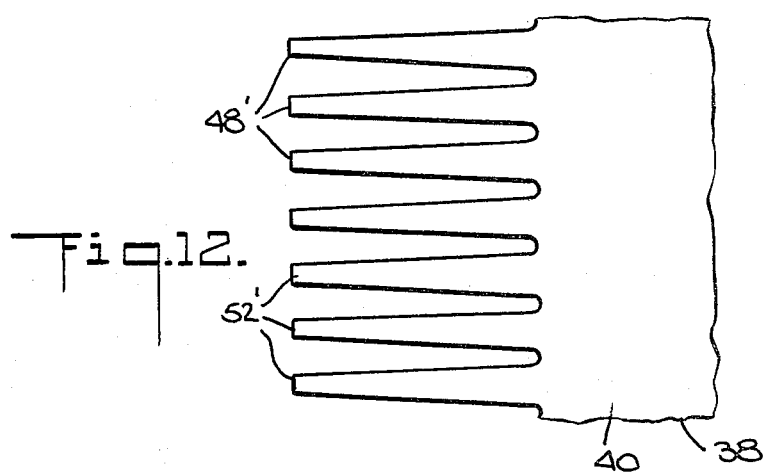
FIG. 12 is a fragmentary view taken along line 12—12 of FIG. 11.

FIGS. 11 and 12 show a modified version of the rotating body 38 which is especially adapted for use in applying an epoxy mortar lining to a pipe. Essentially, the modification of FIGS. 11 and 12 involves the provision of a larger number of thinner and more closely spaced outer vanes 48' with correspondingly thinner spaces 52' between the vanes. The vanes 48' of a device that was actually built had a length of thirteen sixteenths of an inch (2.06 cm) and a width at their base of one eighth inch (3.17 mm). The outer edges of the vanes are rounded to a radius of one thirty second of an inch (0.79 mm). One hundred eighty such vanes, spaced at 2°, were provided in a distributor head whose other dimensions were as given above in connection with FIGS. 1–10. In the modified version of FIGS. 11 and 12 the outer radial edge of each vane 48' is formed with notches 70.

The thinner and more closely spaced vanes 48' and the notches 70 can accommodate the epoxy mortar and apply it to the inner pipe wall in an especially smooth manner so that no subsequent trowelling may be required. For applying epoxy mortar, it has been found preferable to rotate the rotating body at a speed of about 2400 RPM or twice the speed used with cement mortar.

Figure 13:
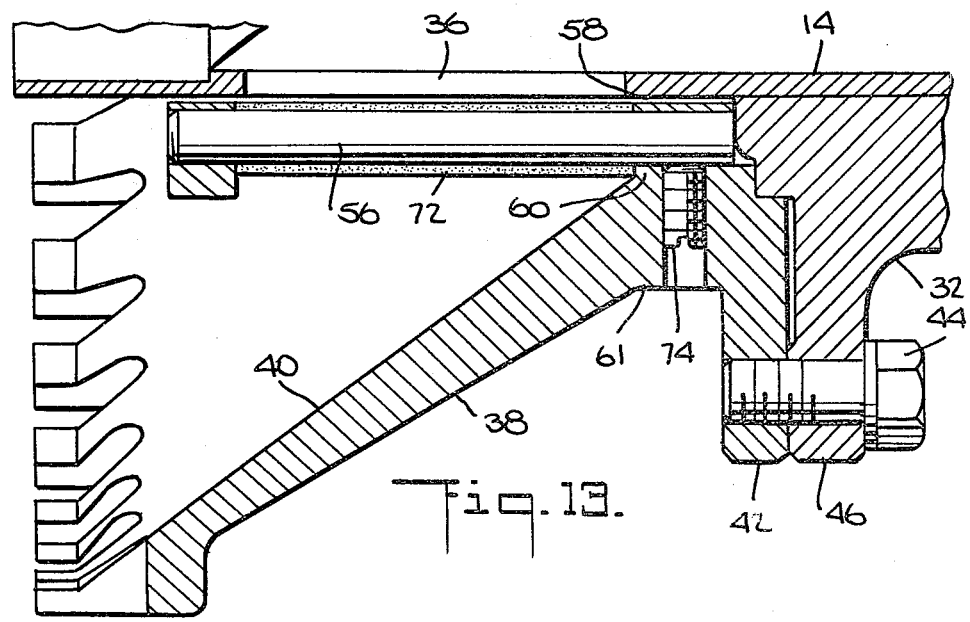
FIG. 13 is a view similar to FIG. 9 but showing a further modification of the distributor head of FIG. 1, said modification constituting a preferred embodiment of the invention.

FIG. 13 shows a still further modified version of the rotating body 38. In this version, the rods forming the inner vanes 56 are provided with a wear resistant coating 72. Also the inner vanes 56 in FIG. 13 are not threaded at their inner ends and the holes 58 in the shoulder 60 are not tapped. Instead, the end of the vanes 56 extend freely into the holes 58 and are secured therein by radial setscrews 74 which are threaded into the collar 61. This is the presently preferred embodiment of the invention.

The coating 72 may be any suitable material which will resist the abrasion caused by the cement mortar which contains hard, gritty particles. A suitable coating material is a molecular ceramic metal sold under the trademark BELZONA (also known as "Belzona Ceramic S-metal") by Belzona Molecular Incorporated of 224 Seventh Street, Garden City, N.Y. 11530.

Figure 14:
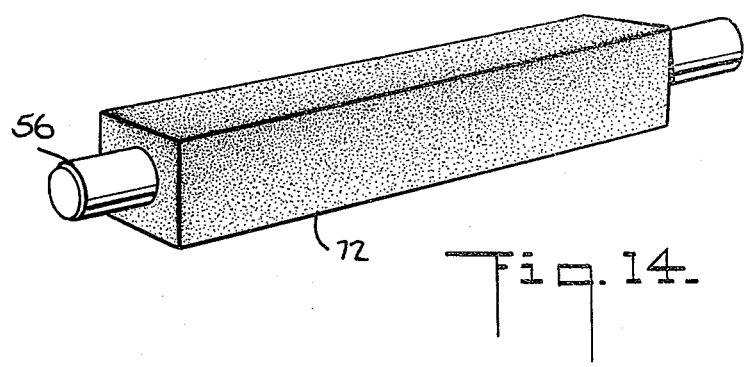
FIG. 14 is a perspective view of an inner vane used in the modification of FIG. 13.

As shown in FIG. 14, the coating 72 may be molded around the vane 56 in the form of a square cross section. This has not yet been tested but based on tests wherein a relatively thin coating of the material has been used, it shows promise of significantly increasing wear life. The square cross section configuration would provide a greater thickness of wear resistant material applied in a more uniform and symmetrical manner and will initially present a flat face toward the mortar stream, with greatest thickness of wear resistant material occurring at the point of greatest abrasion. Additionally, the square cross-sectional configuration permits the presentation of a new wear face to the mortar stream by allowing the vanes to be rotated one quarter turn after the surface facing the mortar stream has worn away.

FIGS. 15-19 show how the square cross section coating 72 would be applied to the vanes 56. As shown in FIG. 15 there is provided a disassemblable form 76 comprising a flat, rectangular bottom plate 78 and elongated side forms 80 along the opposite longer edges on one side of the bottom plate. These side forms 80 are temporarily secured to the bottom plate 78 by bolts 82. The side forms 80 have holes 84 extending through them to accommodate the ends of the vanes 56. As can be seen in FIG. 15, the holes 84 of the opposite side forms 80 are aligned with each other and thus permit several vanes 56 to be inserted so that they extend between the side forms 80 parallel to each other and to the bottom plate 78. A plurality of elongated spacers 86 are secured to the bottom plate 78 to extend between the side forms 80 and between the holes 84. The spacers 86 are also of rectangular cross section and they extend up from the bottom plate 78 to a height beyond the holes 84. As can be seen in FIGS. 16 and 17, the spacers 86 are held to the bottom plate 78 by pins 88. The size and position of the holes 84 and the spacers 86 is such that when the vanes 56 are inserted as shown in FIG. 15, the spacers 86 and bottom plate 78 form elongated, square cross section spaces coaxial with the holes.

Figure 18:
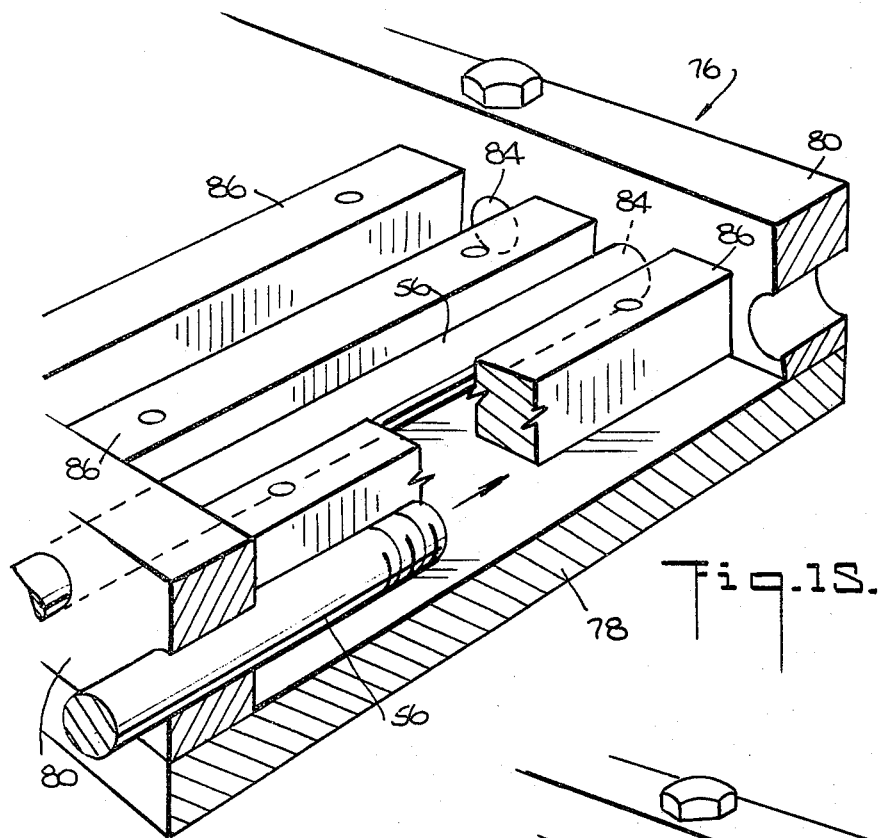
FIG. 18 is a view similar to FIG. 17 but showing the application of an outer coating to inner vanes contained in the fixture.
Figure 19:
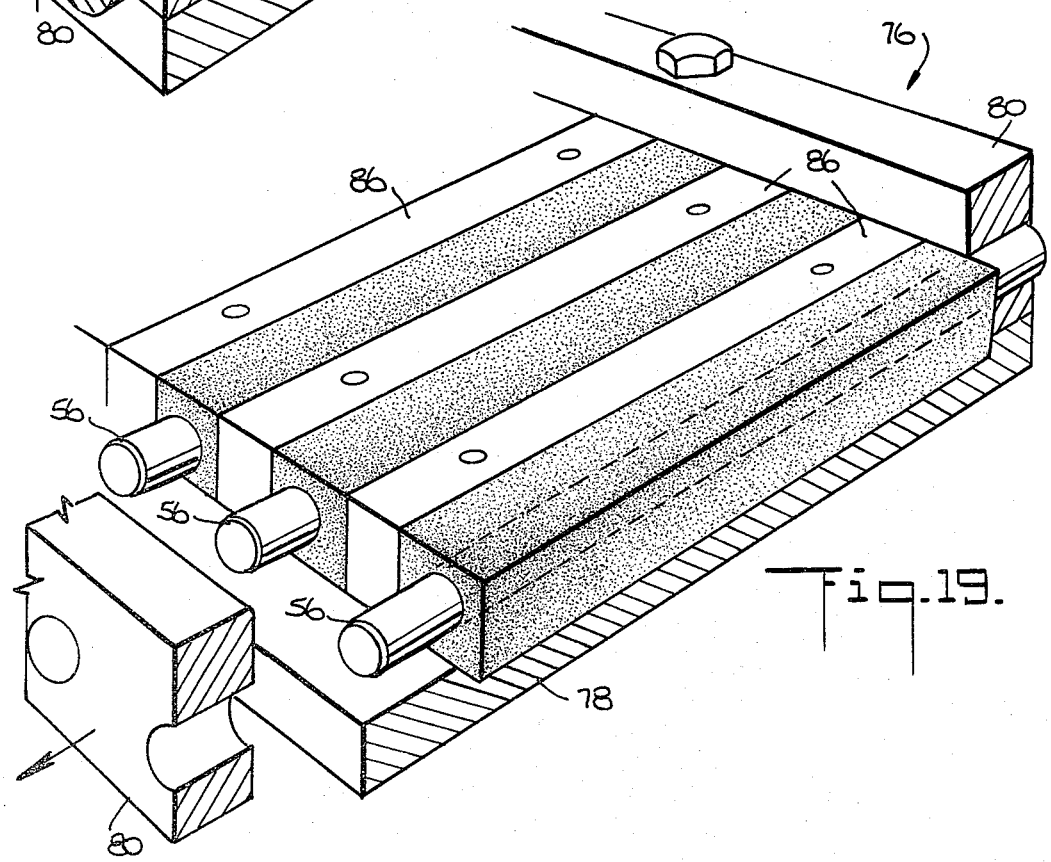
FIG. 19 is a view similar to FIG. 15 but showing the removal of completed inner vanes from the fixture.

When the form 76 is assembled as above described, the cylindrical vanes 56 are inserted in place through the holes 84; and the ceramic coating material 72, in fluid form, is poured into the spaces between the vanes 56, the spacers 86, the bottom plate 78 and the side forms 80. Then, as shown in FIG. 18, the upper surface of coating material 72 is scraped with a blade 90 so that its upper surface is flush with the upper surface of each of the spacers 86. The coating material 72 is then hardened or cured to a solid condition and the form 76 is disassembled as shown in FIG. 19. The vanes 56 with the square cross section coating 72 are then inserted into the distributor as described above in conjunction with FIG. 14.

FIG. 20 shows the cross section of a vane 56 with ceramic coating 72 of square cross section as it is used in the distributor of FIG. 14 to obtain extended wear life. As can be seen in FIG. 20(a) the vane 56 whose cross section is originally round, is provided with a ceramic coating 72 of square cross section. The vane is set in the distributor head so that one flat face 72' of the coating 72 faces the slots 36 in the second supply conduit 20. As the vane wears during use, the face 72' receeds, as shown in FIG. 20(b), as part of the ceramic material and even some of the material of the vane 56 itself wears away. At this point each vane is released in the distributor head by loosening the set screws 62 (FIG. 14). Each vane is then rotated 90° as shown in FIG. 20(c) to bring a second face 72" into position facing the slots 26; and the setscrews 62 are retightened. The distributor head is then operated while the face 72" wears away as shown in FIG. 20(d). The remaining two faces 72''' and 73'''' are then brought into position and used as shown in FIGS. 20(e), 20(f), 20(g) and 20(h). Thereafter the vane 56 is removed from the distributor head and is returned to the disassemblable form 76 for the application of a new coating 72(a) as shown in FIG. 20(i). The recoated vane is then returned to the distributor head and its various new surfaces are used and worn away as shown in FIGS. 20(j) 20(k) and 20 (l). The vane 56 could be recoated and reused indefinitely.

It will be appreciated that the vanes 56 when provided with a square cross section coating and used and recoated as described above will provide an exceptionally long operating life.

It will also be appreciated that the flared inner surface 40 of the rotating body 38 can also be provided with a similar ceramic metal lining. Although the surface 40 does not wear as rapidly as the vanes 56 such coating has been found to appreciably increase its operating life.

We claim:

1. A distributor head for a pipe lining machine in which a fluent substance is thrown outwardly onto the inner wall of a pipe being lined, said distributor head comprising an outer rotating member having an outwardly flared inner surface, means for depositing said fluent substance onto the inner surface of said rotating member so that, as said member rotates, the fluent substance is caused, by centrifugal action, to flow along said inner surface toward its outer edge, said means for depositing said fluent substance comprising an inner conduit for receiving said substance, said inner conduit having elongated slots distributed thereabout and extending axially thereof through which said fluent substance may pass and a plurality of inner vanes mounted to revolve about said inner conduit over said slots to engage the fluent substance and throw it outwardly onto the inner surface of said rotating member, said inner vanes being individually and releasably fitted into a collar at the inner edge of said outer rotating member.

2. A distributor head according to claim 1 wherein said inner vanes extend over the length of said slots.

3. A distributor head according to claim 1 wherein said inner vanes are the form of elongated rods.

4. A distributor head according to claim 1 wherein said slots and inner vanes extend over substantially the same axial region as said flared inner surface.

5. A distributor head according to claim 1 wherein said inner vanes are fitted at their inner ends into openings in said collar.

6. A distributor head according to claim 5 wherein said inner vanes are individually threaded, at their inner ends, into said collar.

7. A distributor head according to claim 5 wherein said inner vanes are held at their inner ends in openings in said collar by means of setscrews.

8. A distributor head according to claim 1 wherein the outer ends of said inner vanes are attached to a ring.

9. A distributor head according to claim 8 wherein the outer ends of said inner vanes extend into openings in said ring.

10. A distributor head according to claim 8 wherein at least some of the outer ends of said inner vanes are held in said openings in said ring by means of setscrews.

11. A distributor head according to claim 1 wherein said inner vanes are coated with a wear resistant coating.

12. A distributor head according to claim 1 or 11 wherein said inner vanes are individually rotatable to present an unworn portion thereof in facing relationship to said slots.

13. A distributor head according to claim 12 wherein the coating on said inner vanes has a square outer cross section.

* * * * *